United States Patent [19]
Oohata et al.

[11] Patent Number: 6,160,775
[45] Date of Patent: *Dec. 12, 2000

[54] OPTICAL DISK DRIVE RECORDING/ REPRODUCTION APPARATUS AND METHOD FOR PRODUCING MODIFIED ADDRESS DATA

[75] Inventors: Hiroyuki Oohata; Kazuhiko Nakane; Kenji Gotoh; Yoshinobu Ishida, all of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/848,603

[22] Filed: Apr. 29, 1997

[30] Foreign Application Priority Data

May 13, 1996 [JP] Japan .................................. 8-117827

[51] Int. Cl.[7] ...................................................... G11B 7/00
[52] U.S. Cl. ............................................. 369/47; 369/54
[58] Field of Search ............................. 369/44.26, 44.29, 369/47, 54, 124, 44.34, 48, 58

[56] References Cited

U.S. PATENT DOCUMENTS

| | | | |
|---|---|---|---|
| 5,444,682 | 8/1995 | Yamada et al. | 369/44.26 |
| 5,452,284 | 9/1995 | Miyagawa et al. | 369/44.26 |
| 5,475,662 | 12/1995 | Miyagawa et al. | 369/44.26 |
| 5,493,552 | 2/1996 | Kobori | 369/44.26 |
| 5,638,354 | 6/1997 | Nakayama et al. | 369/44.26 |
| 5,754,506 | 5/1998 | Nagasawa et al. | 369/44.29 |
| 5,862,112 | 1/1991 | Nugai et al. | 369/44.26 |
| 5,878,008 | 3/1999 | Miyamoto et al. | 369/44.26 |

FOREIGN PATENT DOCUMENTS

| | | |
|---|---|---|
| 0757343A1 | 8/1996 | European Pat. Off. . |
| 63-57859 | 11/1988 | Japan . |
| 6-176404 | 6/1994 | Japan . |
| 7-141701 | 6/1995 | Japan . |
| 8-22621 | 1/1996 | Japan . |

*Primary Examiner*—Thang V. Tran

[57] ABSTRACT

In an optical disk drive apparatus for recording data on and reproducing data from an optical disk using both of data recording tracks formed of grooves and lands, is divided into an integer number of sectors, and the address data area of each sector is shifted in the radial direction. When a first sector is scanned, a data from the address data area of the first sector is read as a first direct address data, and a data from the address data area of an adjacent sector is read as a second direct address data. A first modified address data of the first sector is produced by modifying the second direct address data with an inter-track address difference, and a correct address value of the first sector is produced using the first direct address data and the first modified address data.

11 Claims, 14 Drawing Sheets

FIG. 2

| L/G DISCRIMINATION SIGNAL | G | L |
|---|---|---|
| OUTPUT FROM SELECTOR 5 | PID1<br>PID2<br>PID3+N<br>PID4+N | PID1+N<br>PID2+N<br>PID3<br>PID4 |

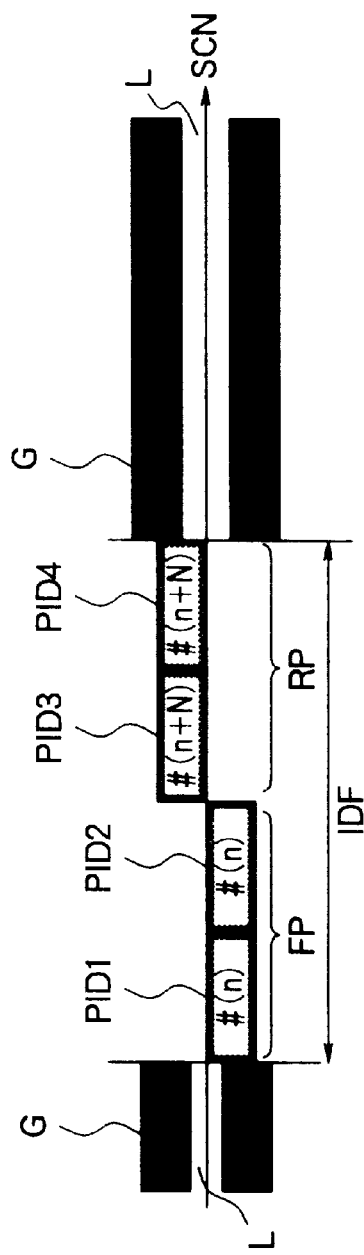

| INPUT TO CIRCUIT 7 | PID1 | PID2 | PID3 | PID4 | PID1+N | PID2+N | PID3+N | PID4+N |
|---|---|---|---|---|---|---|---|---|
| NORMAL | n | n | n | n | | | | |
| ABNORMAL a | n | n | n+1 | n+1 | | | | |
| ABNORMAL b | n | n | n−1 | n−1 | | | | |

| INPUT TO CIRCUIT 7 | PID1+N | PID2+N | PID3+N | PID4+N | PID1 | PID2 | PID3 | PID4 |
|---|---|---|---|---|---|---|---|---|
| NORMAL | n+N | n+N | n+N | n+N | | | | |
| ABNORMAL a | n+N+1 | n+N+1 | n−N | n−N | | | | |
| ABNORMAL b | n+N−1 | n+N−1 | n−N | n−N | | | | |

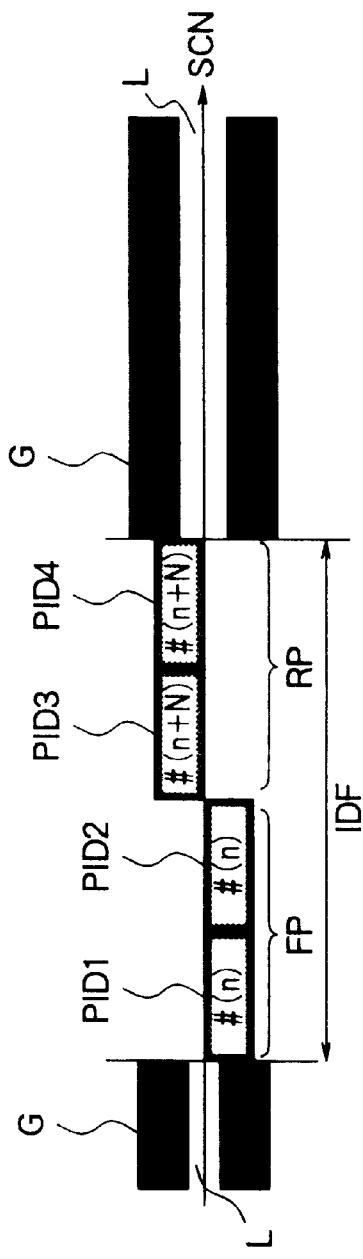

OPTICAL DISK DRIVE RECORDING/ REPRODUCTION APPARATUS AND METHOD FOR PRODUCING MODIFIED ADDRESS DATA

BACKGROUND OF INVENTION

The present invention relates to an apparatus for and a method of recording data on and reproducing data from an optical disk having concentric or spiral recording tracks formed of grooves and lands between the grooves, with the land and groove tracks being divided into sectors, and with address areas for the respective sectors being disposed between the center of a groove and the center of a land adjacent to each other, so that during reproduction of a track, an address for a sector in the track and an address for a sector in an adjacent track are both reproduced.

In a typical example, the address areas for the respective tracks are shifted in one radial direction (e.g., radially outwards), and during reproduction of the track, the address for a sector in the track and the address for a sector in another track adjacent to and disposed in the other radial direction (e.g., radially inward) of the first-mentioned track are both reproduced.

As a data recording method for a large-capacity rewritable optical disk, with an increased recording density, a land/groove recording method has been proposed in which data is recorded both onto the grooves of guide grooves (also referred to G), and onto lands (also referred to L) between the grooves. When this method is used, the recording density can be increased because the track pitch can be halved compared to an optical disk which has the same groove pitch but does not use this method. Grooves and lands may also be referred to as depressed portions and projecting portions, respectively.

An example of conventional land/groove recording optical disk, disclosed in Japanese Examined Patent Application Publication 63-57859 is shown in FIG. 11. As illustrated, grooves 94 and lands 95 are formed by means of guide grooves inscribed on the substrate of the disk, and a recording layer 91 is formed thereon. Recording pits 92 are formed on the recording layer 91 on the grooves 94 and the lands 95. The grooves 94 and the lands 95 form separate continuous recording tracks. That is, the guide grooves are continuous on the disk, so that the recording tracks of the grooves 94 form a continuous recording spiral, and the recording tracks of the lands 95 form a separate continuous recording spiral. A light spot 93 generated by an optical disk drive apparatus records data on or reproduces data from the optical disk, while scanning either of the recording tracks of the lands and the grooves.

In another format, which is shown in FIG. 12, lands and grooves are connected at every revolution to form a single spiral in which lands L and grooves G alternate at very revolution. More specifically, a recording track of a groove (hereinafter referred to as a groove track) having a length corresponding to a revolution of the disk and a recording track of a land (hereinafter referred to as a land track) having a length corresponding to a revolution of the disk are connected alternately to form a recording spiral. This format is herein referred to as a single spiral land/groove format, or an SS-L/G format.

The recording surface of the optical disk is divided into a plurality of annular zones (Z1, Z2), and each revolution of the track is divided into an integer number of sectors RS having an identification data area IDF. The number of sectors per track is progressively increased by "one" toward the outermost zone. In the example shown in FIG. 12, the disk is divided into two zones (Z1, Z2), and the number of sectors per track is three in the inner zone Z1, and is four in the outer zone Z4.

FIG. 13 schematically shows the arrangement of identification data area IDF and the address values recorded within a recording sector RS of an optical disk used with a conventional optical disk drive apparatus. N represents an address of a certain sector, and N represents the number of sectors per track. The identification data area IDF is composed of four PIDs (Physical IDs) and divided into a front part FP and a rear part RP in the beam spot scanning direction SCN. Each of the front part FP and the rear part RP is composed of two PIDs. The front part FP is shifted radially outwards (OP) by half a groove width Dw/2 from the center of a groove, while the rear part RP is shifted radially towards (IP) by half the groove width from the center of the groove.

A method of providing identification data such as a sector address in the identification data area IDF is described next. The address of a groove track sector is assigned to the front part FP of the identification data area IDF which is immediately before the data recording area DRF of the groove track sector, being shifted by half a groove width radially outwards from the center of the groove. On the other hand, the address of a land track sector is assigned to a rear part RP of the identification data area IDF which is immediately before the data recording area DRF in a groove track sector adjacent to and disposed radially outward of the above-mentioned land track sector, being shifted radially inwards by half the groove width from the center of the groove. Consequently, the address of a land track sector is assigned to the rear part RP of the identification data area IDF in a groove track sector, which is immediately before the data recording area DRF of the land track sector, and which is shifted radially outwards by half a groove width from the center of the land. In this way, the address of a land track sector is added to a groove rather than to a land, and an identification data area IDF in a land track sector contains no identification data.

An advantage of having the identification data shifted by half a groove width from the center of a track is that the identification data are shared between a groove track and a land track adjacent to each other, so that the identification data are read with a substantially the same quality, regardless of whether a track sector being scanned is in a land or a groove. When the width of a groove is not identical to a track pitch, the amount of the shift may be set to half a track pitch.

For simplifying the description, it is assumed in FIG. 13 that an identification data area IDF is composed of four PIDs alone. The identification data area IDF may further contain other information such as a header mark or servo control data. Also, synchronization data for address reading, and error detection or error correction codes may also be provided as is known in the art.

Now, description is directed to the prepits in identification data areas around a land/groove connecting points, which are present at every revolution of a disk and which are aligned in a radial direction of the disk, and a method of assigning addresses to such identification data areas. FIG. 14 schematically shows the arrangement of identification data areas within the sectors around connecting points or boundaries between lands and grooves, and the address values assigned thereto. In an SS-L/G format optical disk, there is a boundary extending in the radial direction, at which a land track and a groove track are connected at every revolution of the disk. In a recording sector RS immediately after a land/groove connecting point, the front part FP of the identification data is shifted by half a groove width radially outwards from the center of the groove, and the rear part RP of the identification data area IDF is shifted by half a groove radially inwards from the center of the groove, as in the identification data areas IDF in other sectors (sectors which are not at the connecting points). The assignment of the addresses is also the same as in the sectors which are not at the connecting points. That is, the address of a groove track sector is assigned to the front part FP of the identification data area IDF which is immediately before the data recording area DRF and which is shifted radially outwards by half a groove width from the groove. The address of a land track sector is assigned to the rear part RP of the identification data area IDF which is immediately before the data recording area DRF and which is shifted by half a groove width radially outwards from the land.

In order to detect a land/groove connecting point, determination is made in which radial direction the front part FP of the identification data area IDF and the rear part RP of the identification data area IDF are shifted with respect to the center of a track in a state in which tracking is achieved. The address of a groove track sector can be identified as the address data read from the front part FP of the identification data area IDF, which is shifted radially outwards by half a groove width from the groove, while the address of a land track sector can be identified as the address data read from the rear part RP of the identification data area IDF which is shifted radially outwards by half a groove width from the land. In either case, the part which is shifted radially outwards represents the address of the sector, while the part which is shifted radially inwards represents the address of a sector disposed radially inward of and adjacent to the sector.

When an optical disk drive apparatus for recording data on and reproducing data from an optical disk having the above track configuration detects sector addresses, it obtains the address values in the following manner. That is, when a groove is being scanned, the address value of the PIDs from the front part FP of the identification data area IDF which is shifted radially outwards is read. On the other hand, when a land is being scanned, the address value of the PIDs from the rear part RP of the identification data area IDF which is shifted radially inwards is read.

Because the optical disk drive apparatus performs detection of sector addresses in the above-described manner, it can read four PID data by scanning an identification data area IDF. The address recognition, however, is performed by using the two specific PID data out of the four PID data, depending on whether the sector being addresses are contained in an identification data area IDF, only the two addresses are used for the address recognition. Thus, the ratio of correct address identification is limited.

When it was attempted to use all of the four addresses recorded in the PIDs, it was necessary to provide a memory for storing the number N of sectors per track in the zone being scanned. All of the four addresses can be utilized only because the difference between the address value of a groove track sector and the address value of a land track sector adjacent thereto are independent of each other, all of the four addresses cannot be utilized.

Further, whether the track being scanned is in a groove or a land should be recognized in order to determine whether the front part FP or the rear part RP of an identification data area IDF should be read. If the determination fails for any reason, the identification of the address cannot be achieved.

SUMMARY OF THE INVENTION

The present invention solves problems in the addressing of the above-mentioned style of data. It is therefore an object of the present invention to obtain an optical disk drive apparatus capable of identifying sector addresses and determining whether the sector being scanned is in a land or a grove, with a high reliability, when used with a single spiral land/groove format optical disk. The invention also aims to provide a method of recording data on and reproducing data from such an optical disk.

According to a first aspect of the invention, there is provided a method of recording data on and reproducing data from an optical disk using both of concentric or spiral data recording tracks formed of grooves, and lands between the grooves, with a track corresponding to a revolution of the disk being formed of an integer number of sectors, the sectors each having address data area shifted in the radial direction of the disk so that when one of the sectors in one of the tracks is scanned, the address data area of said one of the sectors, and the address data area of another sector adjacent to said one of the sectors are both scanned, said method comprising the steps of:
(a) reading, when a first sector in a first track is scanned, a data from said address data area of said first sector in said first track to produce a first direct address data, and a data from said address data area of a second sector in a second track adjacent to said first track, to produce a second direct address data;
(b) modifying the second direct address data with an inter-track address difference, to produce a first modified address data of said first sector;
said inter-track address difference representing the difference between the address values of said first sector and said second sector; and
(c) determining a correct address value of said first sector using said first direct address data and said first modified address data.

According to a second aspect of the invention, there is provided an optical disk drive apparatus for recording data on and reproducing data from an optical disk using both of concentric or spiral data recording tracks formed of grooves, and lands between the grooves, with a track corresponding to a revolution of the disk being formed of an integer number of sectors, the sectors each having address data area shifted in the radial direction of the disk so that when one of the sectors in one of the tracks is scanned, the address data area of said one of the sectors, and the address data area of another sector adjacent to said one of the sectors are both scanned, said apparatus comprising:
a reproducing section for reading, when a first sector in a first track is scanned, a data from said address data area of said first sector in said first track to produce a first direct address data, and a data from said address data area of a second sector in a second track adjacent to said first track, to produce a second direct address data;
a modifying circuit for modifying the second direct address data with an inter-track address difference between the address values of said first sector and said second sector, to produce a first modified address data of said first sector; and
a determination circuit using said first direct address data and said first modified address data to determine a correct address value of said first sector.

With the above arrangement, during scanning a certain sector, not only the address data of the sector, but also the address data of an adjacent sector are read and utilized for finding the correct address data. This effectively enhances the redundancy of the address data, and reliability of the address reproduction is improved.

The optical disk apparatus may further comprise an absolute difference value calculating circuit for calculating an absolute value of the difference between said first direct address value and said second direct address value, and it may be so arranged that said modifying circuit uses said absolute value as said inter-track address difference.

With the above arrangement, the inter-track difference can be obtained from the absolute value of the difference between the address data read from the address data areas during the scanning, so that it is not necessary for the apparatus to know or store the inter-track address difference in advance. This is particularly advantageous where the disk is divided into a plurality of zones, and the inter-track address difference (which may be the number of sectors per track) varies from one zone to another.

It may be so arranged that said modifying circuit stores the inter-track address difference, and modifying the direct address value with the stored inter-track address difference, each of the address data areas contains a plurality of address data, and said apparatus further comprises:

a first address value coincidence circuit for determinating whether the plurality of the first direct address data read from the address data area in the first sector have an identical value;

a second address value coincidence circuit for determinating whether the plurality of the second direct address data read from the address data area in the second sector area have an identical value; and a gate circuit for permitting the inter-track address difference stored in the modifying circuit to be updated on condition that said first address value coincidence circuit finds that the first direct address data have an identical value, and said second address value coincidence circuit finds that the second direct address data have an identical value.

With the above arrangement, the inter-track address difference is updated only when there is no error in the address data having been read without error. The reliability of the determination of the correct address is therefore enhanced. Such updating of the inter-track address difference is useful when the disk is divided into a plurality of zones having different inter-track differences.

It may be so arranged that the address data areas for the sectors adjacent to each other are disposed in different positions in the direction of the tracks, one in a front part and the other in a rear part, so that they are scanned one after another;

said modifying circuit also modifies the first direct address data read from the address data area of said first sector, with the inter-track address difference, to produce a second modified address data of said second sector; and said apparatus further comprises a selector receiving and selecting, as said first direct and modified address data, either of the address data read from the address data area at the front part and the corresponding modified address data, and the address data read from the address data area at the rear part and the corresponding modified address data, depending on whether the sector being scanned is in a groove track or a land track;

said determinating circuit receives the outputs of the selector and determines whether the address data output from the selector have an identical value.

With the above arrangement, it is possible to determine which of the address data reproduced successively is the address data of the sector being scanned.

It may be so arranged that said determinating circuit determines that the track being scanned is a groove track if the direct address data and the modified address data of a groove track sector have an identical value; and that the track being scanned is a land track if the direct address data and the modified address value of a land track sector have an identical value.

When a groove track is scanned, the first direct address data and the first modified address data are the address data for a groove track sector, and the second direct address data and the second modified address data are the address data for a land track sector. When a land track is scanned, the first direct address data and the first modified address data are the address data for a land track sector, and the second direct address data and the second modified address data are the address data for a groove track sector. Whether the track being scanned is a land track sector or a groove track sector can therefore be determined on the basis of the address data which are read from the address data areas during scanning.

It may be so arranged that if said determining circuit finds that the direct address data of the groove track sector and the modified address value of the groove track sector do riot have an identical value, and the direct address data of the land track sector and the modified address value of the land track sector do not have an identical value, then said determining circuit finds that the inter-track address difference is erroneous, determines that the track being scanned is a groove track if the difference between the direct address data and the modified address value of the groove track sector is smaller than the difference between the direct address data and the modified address value of the land track sector, and determines that the track being scanned is a land track if the difference between the direct address data and the modified address value of the land track sector is smaller than the difference between the direct address data and the modified address value of the groove track sector, and when said inter-track address difference is found to be erroneous, said determinating circuit outputs the value of the direct address value as the correct address value.

The above arrangement is advantageous when the disk is divided into a plurality of zones having different inter-track differences, and when the inter-track difference is provided from a controller. That is, even when an access is made to a zone different from the zone to which access was originally intended, the address value which is most likely to be correct is selected as the correct address value, and the discrimination between a land and a groove can be achieved.

The apparatus may further comprises a controller providing said inter-track address difference.

With the above arrangement, it is not necessary to provide a circuit within the sector address data reading section to calculate the inter-track address difference.

BRIEF DESCRIPTION OF THE DRAWINGS

FIG. 2 is a table showing the operations of a selector in the optical drive apparatus shown in FIG. 1;

FIG. 5A shows scanning of identification data area in a land track sector by a light spot;

FIG. 5B and FIG. 5C show the address values produced in the circuit of FIG. 3 during the scanning shown in FIG. 5A;

FIG. 8A shows scanning of identification data area in a land track sector by a Light spot;

FIG. 8B and FIG. 8C show the address values produced in the circuit of FIG. 6 during the scanning shown in FIG. 8A;

DETAILED DESCRIPTION OF PREFERRED EMBODIMENTS

Embodiments of the present invention will now be described with reference to the appended drawings.

First Embodiment

Figure 1:
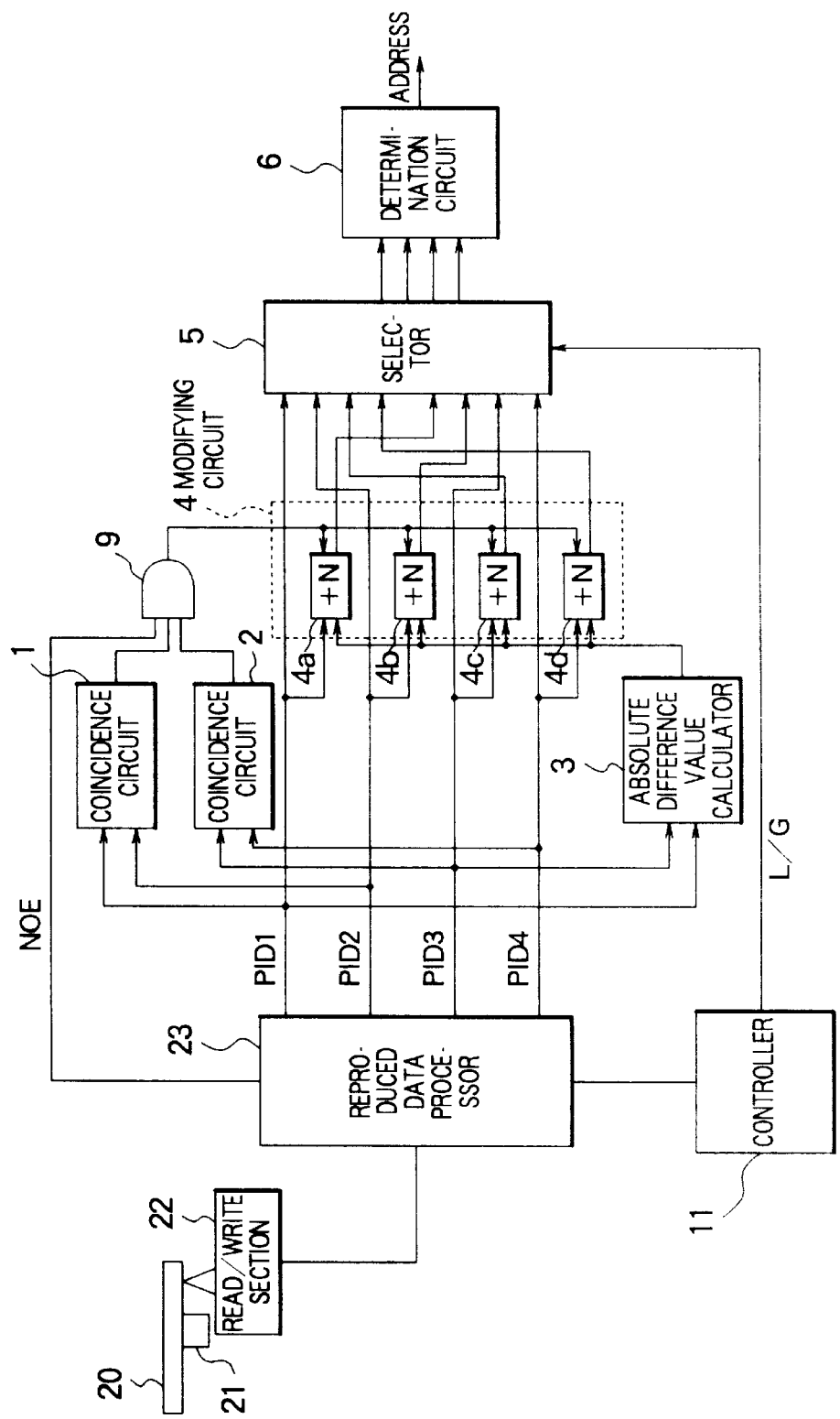
FIG. 1 is a block diagram showing the configuration of an optical disk drive apparatus including a sector address reading section according to a first embodiment of the present invention.

An optical disk drive apparatus according to the first embodiment of the present invention will be described with reference to FIG. 1 and FIG. 2. The description will be made with particular attention to identification of the sector addresses. FIG. 1 is a block diagram showing the configuration of an optical disk drive apparatus including a sector address reading section according to the first embodiment of the present invention. It is assumed that an optical disk used with the optical disk drive apparatus is of an SS-L/G format having a track configuration illustrated in FIG. 11 through FIG. 14.

Referring to FIG. 1, an optical disk 20 is rotated by a spindle motor 21, and a read/write section 22 including an optical head which is not specifically shown is provided to record data on and read data from the optical disk 20. The read/write section 22 outputs reproduced data. A reproduced data processor 23 receives the reproduced data, and processes the data in various ways. In particular, it separates, and adjusts (by temporary storage or delay) the timing of the data, and produces signals PID1 through PID4 representing the values of four PIDs read from a sector on the optical disk.

The reproduced signal processor 23 also determines whether any error is detected (by means of an error correction decoding, not shown) in reading the PID data, and produces a signal NOE indicating the result of this determination. This signal is active when no uncorrectable error has been detected.

A coincidence circuit 1 determines whether the values of the PID1 and the PID2 are identical. Another coincidence circuit 2 determines whether the values of the PID3 and the PID4 are identical. During recording or reproduction of an optical disk having an address arrangement shown in FIG. 13 and FIG. 14, if PID data have been read correctly, the two address values PID1 and PID2 read from the front part of the identification data area IDF should be identical. Similarly, the address values PID3 and PID4 read from the rear part of the identification data area IDF should also be identical. The coincidence circuits 1 and 2 check whether these are true.

An absolute difference value calculator 3 calculates the absolute value N of the difference between the values of the PID1 and the PID3. With the address arrangement of the optical disk under consideration, the values of the PID1 and the PID2 are identical, and the values of the PID3 and the PID4 are also identical, so that the PID2 and the PID4 may be supplied to the absolute difference value calculator 3 instead of the PID1 and the PID3.

Figure 12:
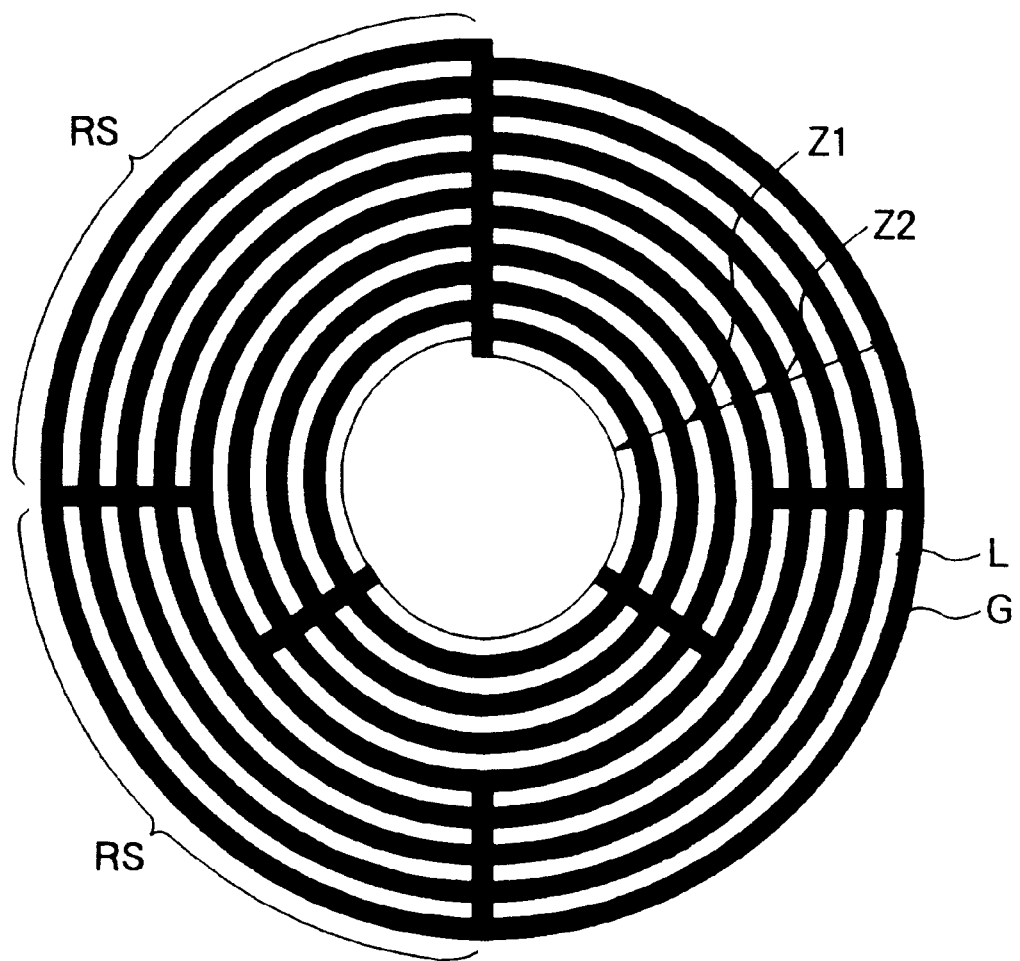
FIG. 12 schematically illustrates the configuration of tracks on an optical disk of a single spiral land/groove configuration.
Figure 13:
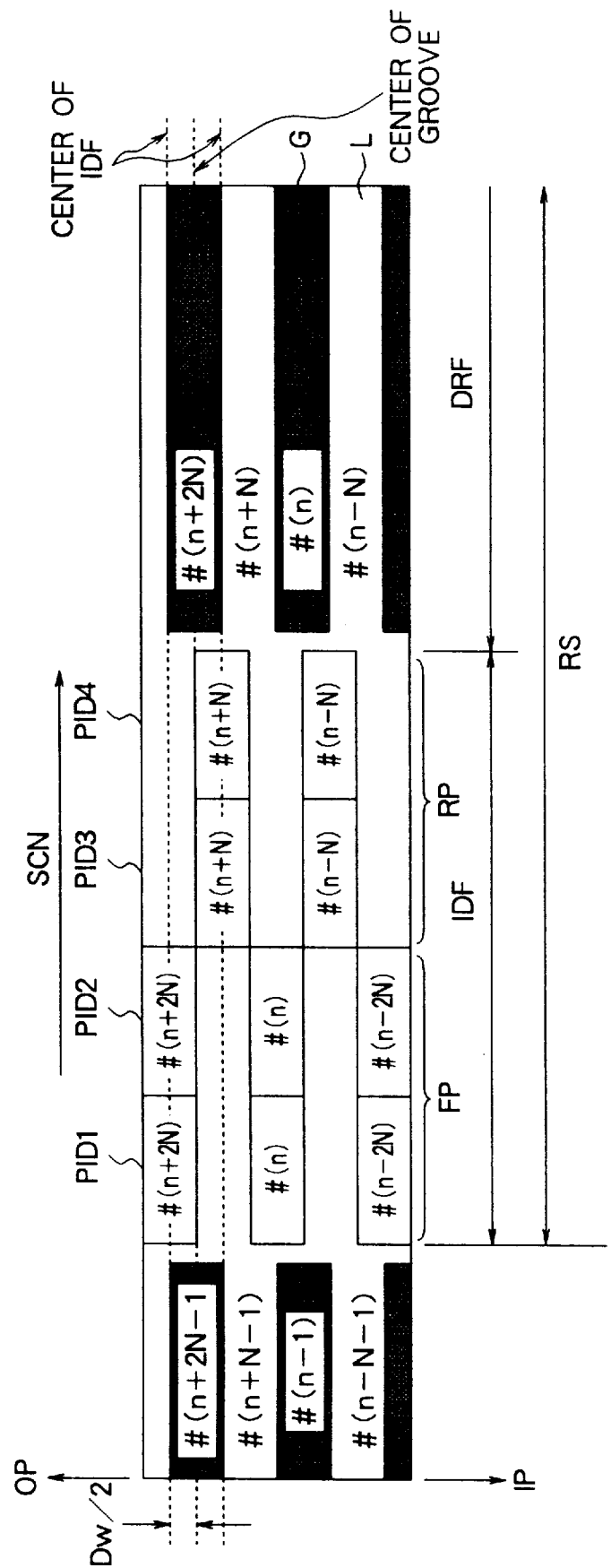
FIG. 13 shows the arrangement of identification data areas and the address values in a track sector on an optical disk used with a conventional optical disk drive apparatus.
Figure 14:
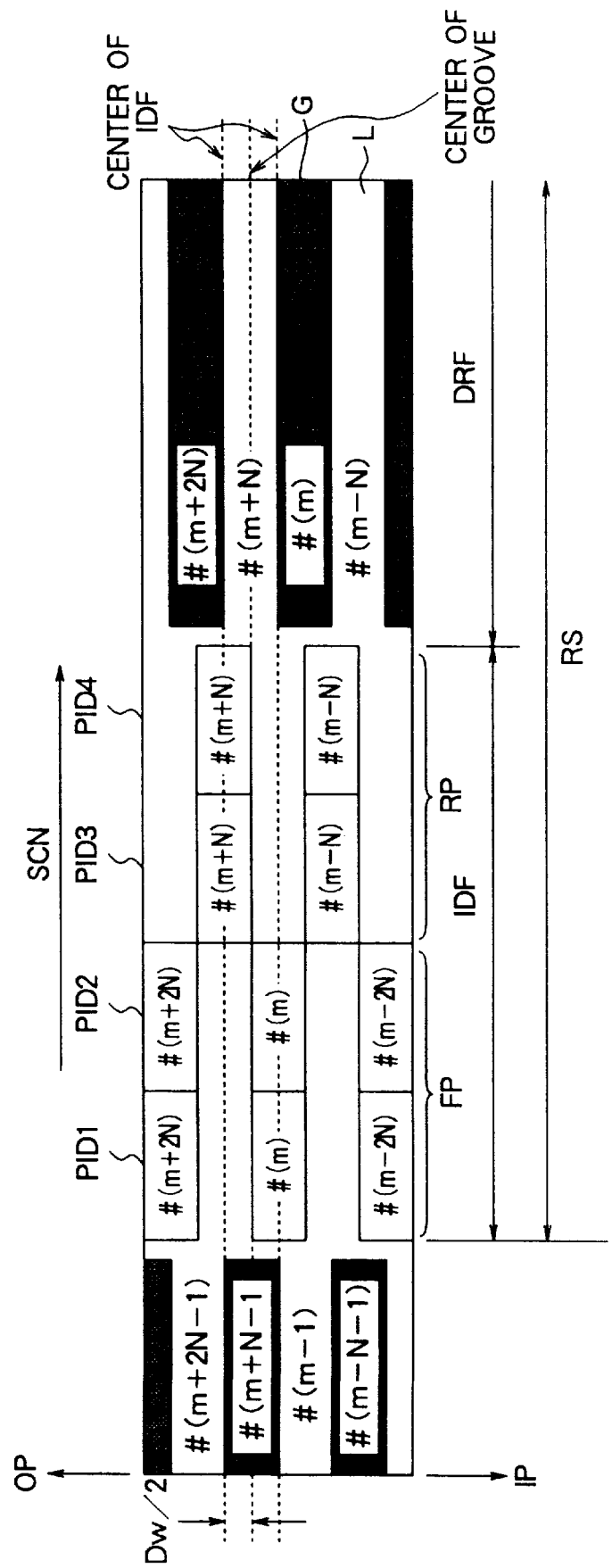
FIG. 14 shows the arrangement of identification signal areas and the address values in a track sector around a land/groove boundary on a convetional optical disk.

The absolute difference value N is also called inter-track address difference value. The disk It may be identical to the number of the sectors per track. In the example under consideration, the disk is divided into a plurality of annular zones, as shown in FIG. 12, and the number of sectors per track varies from one zone to another, and the inter-track address difference value varies from one zone to another.

A modifying circuit 4 includes four latches 4a to 4d. Each of four latches 4a to 4d latches and stores the absolute difference value N, and adds this value to the corresponding one of the values of the PID1 to PID4. Latching or updating is effected when an address value updating condition has been satisfied. The address value updating condition includes that the output of the coincidence circuit 1 indicates a coincidence between the values of the PID1 and the PID2, and the output of the coincidence circuit 2 indicates a coincidence between the values of the PID3 and the PID4, and that no error is detected (by means of an error correction decoding, not shown) in reading the PID data. Whether the last-mentioned condition is met is determined in the reproduced data processor 23, and is represented by the signal NOE. Whether all these three conditions are concurrently satisfied is checked by an AND gate 9.

A selector 5 receives a land/groove discrimination signal L/G from a controller 11, and the address values of PID1 through PID4, and the values from the latches 4a to 4d, obtained by adding the absolute value N to each of the address values of PID1 through PID4. The values from the latches 4a to 4d are called modified address values. For distinction, the address values of PID1 to PID4 are sometimes called direct address values.

FIG. 2 shows the operation of the selector 5 for an optical disk drive apparatus according to the first embodiment of the present invention. FIG. 2 shows that if the land/groove discrimination signal L/G is "G" indicating that the track sector being scanned is in a groove, the selector 5 outputs the values of the PID1, PID2, PID3+N, and PID4+N, and that if the land/groove discrimination signal L,/G is "L" indicating that the track sector being scanned is in a land, the selector 5 outputs the values of the PID1+N, PID2+N, PID3, and PID4. If the PID data are read correctly from the disk, these four values of the output signals from the selector are all identical. Thus, redundancy of the address data is enhanced, and reliability of the address data reproduction is improved.

The determination circuit 6 determines the address value (also called "correct address value", for distinction from the direct address value, and the modified address value) of the sector based on the four output values from the selector 5. If the four inputs have an identical value, the determination circuit 6 outputs this value as the address value of the sector being scanned. If the four inputs do not have an identical value, the determination circuit 6 selects the value of one or more of the inputs which is found to be most likely, using a majority logic or the like, and outputs the selected value as the correct address value of the sector being scanned.

Description is now directed to a method of determining whether the track sector being scanned is in a groove or a land. While a beam spot is passing through the front part of the identification data area IDF of a groove track sector, the tracking error signal indicates that the beam spot is shifted radially inwards by substantially half a track pitch from the track center, i.e., indicating the maximum shift in one radial direction (first radial direction). It is because the front part of the identification data area IDF of the groove track sector is shifted radially outwards. On the other hand, the rear part of the identification data area IDF is shifted radially inwards. Thus, while a beam spot is passing through the rear part of the identification data area IDF of the groove track sector, the tracking error signal indicates that the beam spot is shifted radially outwards by substantially half the track pitch from the groove center, i.e., indicating the maximum shift in the opposite radial direction (second radial direction).

In this way, if the tracking error signal indicates radially inward deviation of tracking at the front part of the identification data area, and indicates radially outward deviation of tracking at the rear part of the identification data area, the track sector having this identification data area can be determined to be a groove track sector. In this case, a land/groove discrimination signal L/G indicating that the sector being scanned is in a groove is supplied to the selector 5.

In contrast, while a beam spot is passing through the front part of the identification data area of a land track sector, the tracking error signal indicates that the beam spot is shifted radially outwards by substantially half a track pitch from the track center, i.e., indicating the maximum shift (in the second direction). It is because the front part of the identification data area of the land track sector is shifted radially inwards. On the other hand, the rear part of the identification data area is shifted radially outwards. Thus, while the beam spot is passing through the rear part of the identification data area of the land track sector, the tracking error signal indicates that the beam spot is shifted radially inwards by substantially half a track pitch from the groove center, i.e., indicating the maximum shift in the opposite direction (the first direction). Accordingly, if the tracking error signal which is produced during the data reading from the identification data area indicates radially outward deviation of tracking at the front part, and radially inward deviation of tracking at the rear part, the track sector having this identification data area can be determined to be a land track sector. In this case, the land/groove discrimination signal L/G supplied to the selector indicates that the sector being scanned is in a land.

The above-described determination is performed in the reproduced data processor 23, and the result of the determination is stored in the controller 11, and supplied to the selector 5, as described above.

There are several other methods of determining whether the sector being scanned is in a groove or a land, and any one of these methods can be used alternatively.

It was stated above that the determination circuit C outputs the address value of the four inputs when they are identical. If three of the inputs have an identical value, with the remaining one input having a different value, then the value of the three inputs may be selected as the correct address value, and output. If this method is used, it is still possible to identify or recognize the address value of the sector being scanned even when an error has occurred in one of the values read from the four PIDs.

Further, when only two of the four inputs have an identical value, or the four inputs all have values different from each other, the values of the inputs in connection with which an uncorrectable error has been detected (by an error correction decoding, not shown) may be discarded, and the values of the remaining inputs may be used to find the correct address value.

This concept of discarding the address values may also be applied even where the three or more inputs have an identical value. That is, the value or the input or inputs in connection with which an uncorrectable error has been detected may be discarded first, and then the majority logic may be applied to the remaining inputs. This makes it possible to obtain a correct address when only one input is free from an error.

The concept of discarding the address values may also be applied to the operation of the coincidence circuits I and 2. That is, in finding whether the four inputs to the coincidence circuits 1 or 2 arc identical, the inputs in connection with which an uncorrectable error has been detected may be discarded, and decision on the coincidence may be made on the remaining inputs (with no uncorrectable errors).

As has been described, when the optical disk drive apparatus according to the first embodiment records data on or reproduces data from an optical disk in which the address of a groove track sector is assigned to the front part of the identification data area IDF that is immediately before the data recording part of the sector, and that is shifted radially outwards by half a groove width from the center of the groove, and the address of a land track sector is assigned to the rear part of the identification data area IDF that is immediately before the data recording part in the sector in the groove track adjacent to and radially outside of the land track sector, and that is shifted radially inwards by half the groove width from the center of the groove, the address of the sector being scanned can be identified based on the address values of the PIDs and the information as to whether the sector being scanned is in a land or a groove.

The number N of sectors per track for each zone (or the inter-track address difference value) can be obtained from the output value of the absolute difference value calculator 3 based on the address values of the PIDs. It is therefore unnecessary to the value N for each sector to be known in advance, and stored in a memory in the optical drive apparatus.

If the number N of sectors determined by the absolute difference value calculator 3 is loaded in the latches 4a to 4d on condition that no error has been detected by means of an error correcting codes appended to the PIDs, or the like (during error correction decoding), the address data reading can be performed with a higher reliability.

Further, in addition to the case where the four inputs to the determination circuit 6 have an identical value, the address value can be identified even if only three inputs have an identical value, or only two inputs have an identical value, and are free from an error. Thus, the address data reading can be performed with a higher recognition rate.

Second Embodiment

Figure 3:
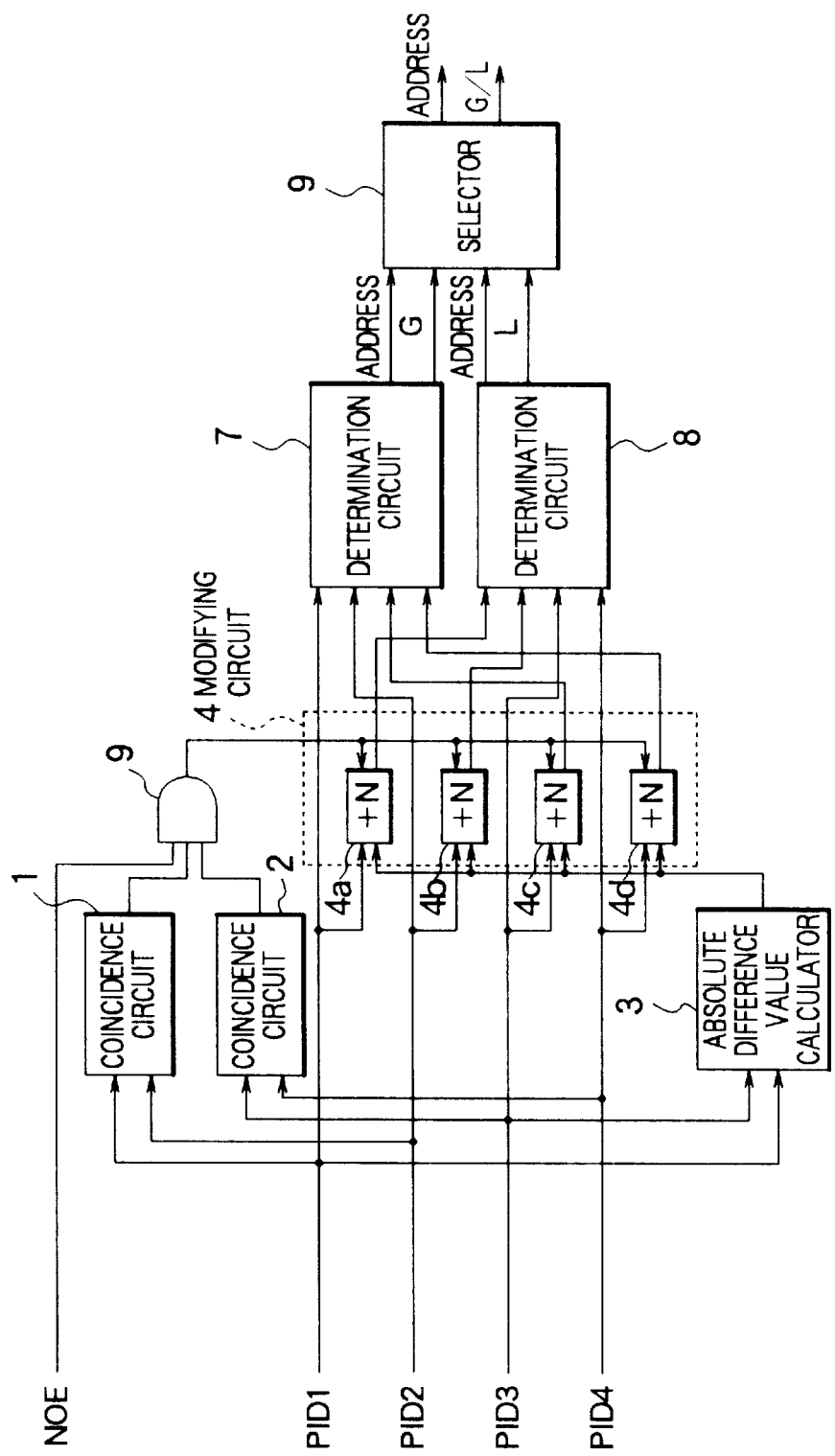
FIG. 3 is a block diagram showing the configuration of a sector address reading section in an optical disk drive apparatus according to a second embodiment of the present invention.

Another embodiment of the present invention will be described with reference to FIG. 3 to FIG. 5C. In the first embodiment, a land/groove discrimination signal L/G supplied from the controller 11 is used for determining whether the track sector being scanned is in a land or a groove. In this embodiment, both of the identification of a sector address and the discrimination between a land track sector or a groove track sector are effected based of four PID data alone. FIG. 3 is a block diagram showing the configuration of a sector address reading section in an optical disk drive apparatus according to the second embodiment of the present invention.

Referring to FIG. 3, the signals PID1 through PID4 represent values of the four PIDs which have been read from a sector on an optical disk, and are supplied from the reproduced data processor 23 shown in FIG. 1. The coincidence circuit 1 determines whether the values of the PID1 and the PID2 are identical. The coincidence circuit 2 determines whether the values of the PID3 and the PID4 are identical.

The absolute difference value calculator 3 calculates the absolute value (N) of the difference between the values of the PID1 and the PID3. Because of the address arrangement of the optical disk described herein, the values of the PID1 and the PID2 are identical, and the values of the PID3 and the PID4 are also identical, the PID2 and the PID4 may be supplied to the absolute difference value calculator 3 instead of the PID1 and the PID3, respectively.

A modifying circuit 4 includes four latches 4a to 4d. Each of four latches 4a to 4d latches and stores the absolute difference value N, and adds this value to the corresponding one of the values of the PID1 to PID4. Latching or updating is effected when an address value updating condition has been satisfied. The address value updating condition includes that the output of the coincidence circuit 1 indicates a coincidence between the values of the PID1 and the PID2, and the output of the coincidence circuit 2 indicates a coincidence between the values of the PID3 and the PID4, and that no error is detected (by means of an error correction decoding, not shown) in reading the PID data. Whether the last-mentioned condition is met is determined in the reproduced data processor 23, and is represented by the signal NOE. Whether all these three conditions are concurrently satisfied is checked by an AND gate 9.

A determination circuit 7 receives the input PID1 and the input PID2, as well as the outputs PID3+N and PID4+N from the latches 4c and 4d, and when the values of the four inputs (PID1, PID2, PID3+N, and PID4+N) all have an identical value, it outputs this value as correct the address value of the sector being scanned, and also outputs a groove recognition signal G (i.e., makes the signal G active) indicating that the sector being scanned is in a groove.

A determination circuit 8 receives the input PID3 and the input PID4, as well as the outputs PID1+N and PID2+N from the latches 4a and 4b, and when the values of the four inputs (PID1+N, PID2+N, PID3, and PID4) all have an identical value, it outputs this value as the correct address value of the sector being scanned, and also output a land recognition signal L (i.e., makes the signal L active) indicating that the sector being scanned in in a land.

When the signal G is input (the signal G is active), a selector 9 selects the address value from the determination circuit 7, and outputs it as the address value of the sector being scanned. When the signal L is input (signal L is active), the selector 9 selects the address value from the coincidence circuit 8, and outputs it as the address value of the sector being scanned. In this way, the selector 9 selects the address value of front part of the identification data area IDF, or the address value of the rear part of the identification data area IDF depending on which of the land recognition signal L and the groove recognition signal G is active.

The selector 9 also produces an land/groove discrimination signal L/G indicating whether the sector being scanned is in a land or a groove based on the signals G and L.

Figures 4A, 4B, 4C:
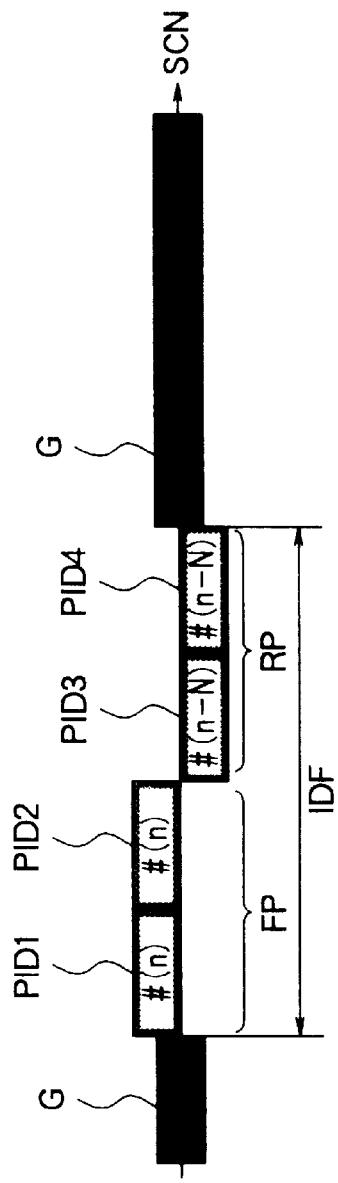
FIG. 4A shows scanning of identification data area in a groove track sector by a light spot.
FIG. 4B and FIG. 4C show the address values produced in the circuit of FIG. 3 during the scanning shown in FIG. 4A.

FIG. 4B and FIG. 4C show the values supplied to the determination circuits 7 and 8 when a beam spot from an optical disk drive apparatus according to the second embodiment of the present invention is scanning a groove track sector, as indicated by SCN shown in FIG. 4A. The beam spot is passing through a groove track sector with an address value n. When the beam spot is passing through the identification data area IDF, the address values read from the PID1, PID2, PID3, and PID4 will be n, n, n−N, and n−N, respectively. Thus, the four values supplied to the determination circuit 7 will be all n, as shown in FIG. 4B. The groove recognition signal G is therefore made active.

On the other hand, the values supplied to the determination circuit 8 will be n+N, n+N, n−N, and n−N. The land recognition signal L is therefore made inactive.

Because the four inputs to the determination circuit 7 have an identical value, the groove recognition signal G which is active and the address value n which are common to all the four inputs to the determination circuit 7 are supplied to the selector 9.

Because the groove recognition signal G is active, and the land recognition signal L is inactive, the selector 9 selects and outputs the address value n from the determination circuit 7, as the address value of the sector being scanned.

The above scheme is adopted based on the fact that when a groove track sector is scanned, the value of the PID1 or PID2 is greater than the value of the PID3 or PID4 by N, and that the value of the PID1 or PID2 indicates the address of the groove track sector.

Further, by using the value of the PID3+N and the value of the PID4+N as well as the values of the PID1 and the PID2 as the address data for a groove track sector, the redundancy of the address data is enhanced.

FIG. 5B and FIG. 5C show the address values supplied to the determination circuits 7 and 8 when a beam spot from an optical disk drive apparatus according to the second embodiment of the present invention is scanning a land track sector, as indicated by SCN shown in FIG. 5A. The beam spot is passing through a land track sector with an address value n+N. When the beam spot is passing through the identification data area IDF, the address values read from the PID1, PID2, PID3, and PID4 will be n, n, n+N, and n+N, respectively. Thus, the four values supplied to the determination circuit 7 will be n, n, n+2N, and n+2N, as shown in FIG. 5B.

The groove recognition signal G is therefore inactive. The values supplied to the determination circuit 8 will be all n+N. Thus, the four inputs to the determination circuit 8 have an identical value, so the land recognition signal L is made active, and the address value n+N is supplied to the selector 9. Because the groove recognition signal G is inactive, and the land recognition signal L is active, the selector 9 selects and outputs the address value n+N from the determination circuit 8, as the address value of the sector being scanned.

The above scheme is adopted based on the fact that when a land track sector is scanned, the value of the PID3 or PID4 is greater than the value of the PID1 or PID2 by N, and that the value of the PID3 or PID4 indicates the address of the land track sector.

Further, by using the value of the PID1+N and the value of the PID2+N as well as the values of the PID3 and the PID4 as address data for the land track sector, the redundancy of the address data is enhanced.

It was described that when the four inputs have an identical value, the determination circuit 7 outputs this value as the address value. The alternative methods of determination described in connection with the determination circuit 6 in FIG. 1 may also be applied to the determination circuit 7. For instance, if three inputs have an identical value, this value may be output as the correct address value, and the groove recognition signal G may be made active. Such a modification may also be applied to the determination circuit 8.

As has been described, when the optical disk drive apparatus according to the first embodiment records data on or reproduces data from an optical disk in which the address of a groove track sector is assigned to the front part of the identification data area IDF that is immediately before the data recording part of the sector, and that is shifted radially outwards by half a groove width from the center of the groove, and the address of a land track sector is assigned to the rear part of the identification data area IDF that is immediately before the data recording part in the sector in the groove track adjacent to and radially outside of the land track sector, and that is shifted radially inwards by half the groove width from the center of the groove, whether the sector being scanned is in a groove or a land can be determined just from the address values of PIDs.

The number N of sectors per track for each zone (or the inter-track address difference value) can be obtained from the output value of the absolute difference value calculator 3 based on the address values of the PIDs. It is therefore unnecessary to the value N for each sector to be known in advance, and stored in a memory in the optical drive apparatus.

If the number N of sectors determined by the absolute difference value calculator 3 is loaded in the latches 4a to 4d on condition that no error has been detected by means of an error correcting codes appended to the PIDs, or the like (during error correction decoding), the address data reading can be performed with a higher reliability.

Further, in addition to the case where the four inputs to the determination circuit 7 or 8 have an identical value, the address value can be identified even if only three inputs have an identical value, or only two inputs have an identical value, and are free from an error. Thus, the address data reading can be performed with a higher recognition rate.

Third Embodiment

Figure 6:
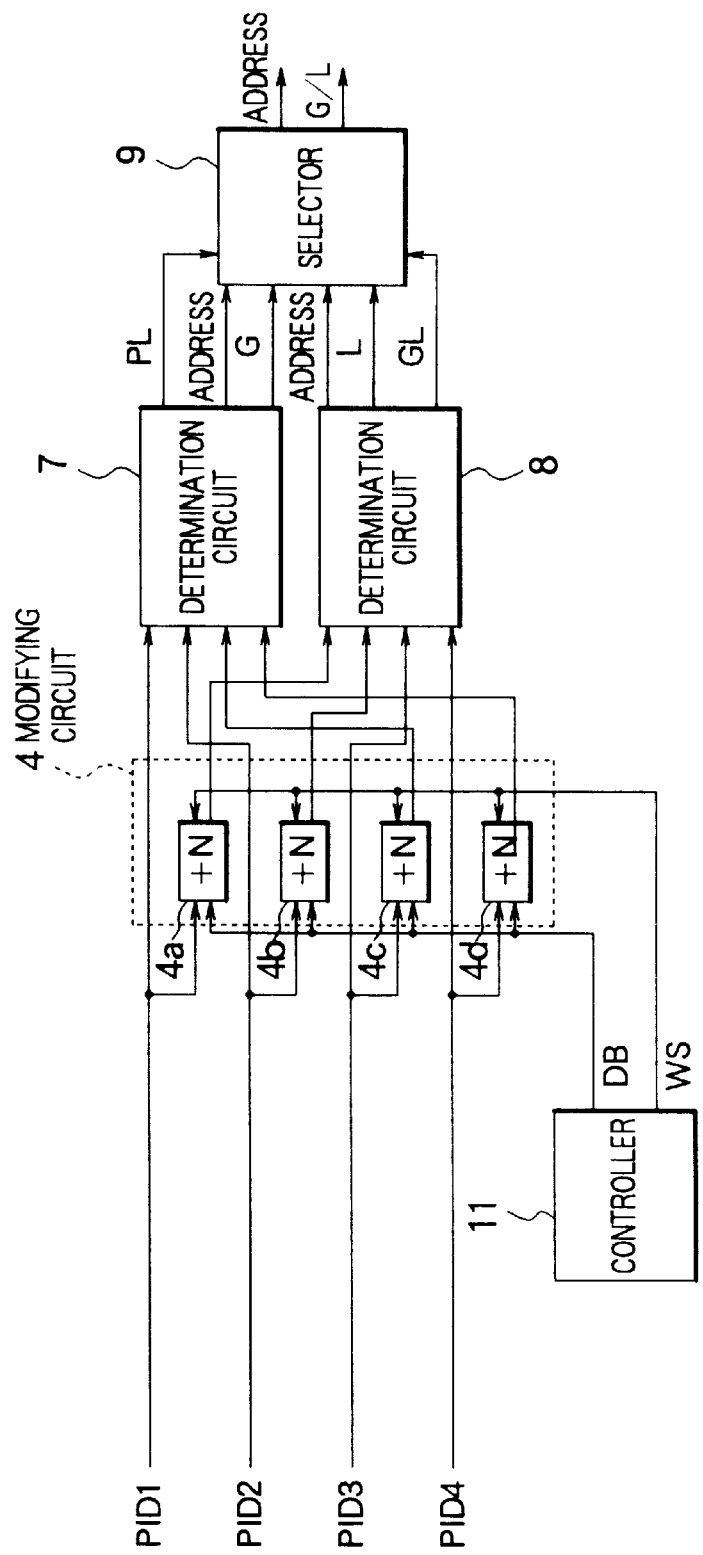
FIG. 6 is a block diagram showing the configuration of a sector address reading section in an optical disk drive apparatus according to a third embodiment of the present invention.

Another embodiment of the present invention will be described with reference to FIG. 6 to FIG. 8C. In the first, and second embodiments, the number N of sectors per track within a zone is obtained from the address values read from the PIDs. This embodiment is different from the first or second embodiment in that the value of the number N is supplied from a controller 11, and is loaded through a data bus DB in an optical disk drive device. FIG. 6 is a block diagram showing the configuration of a sector address reading section in an optical disk drive apparatus according to the third embodiment of the present invention.

Description is now directed to the difference between FIG. 6 and FIG. 3 which was used for describing the second embodiment. The value of the number N of sectors per track within a zone is supplied from the controller 11 to the sector address reading section. The timing at which the value of the N is latched by the latches 4a to 4d is determined by a write signal WS fed from the controller 11 via a writing signal line. The controller 11 has a memory into which the value of N for each of the zones is written in advance for each disk format. If only the zone to be accessed is specified, the value of the N can be identified in view of the disk format by which the number of sectors per track is defined for each zone.

When track access is executed to a track near a zone boundary, the access may sometimes fail, and a track in an adjacent zone may be accessed. In such a case, the values of the inputs do not coincide, at both of the determination circuits 7 and 8, and discrimination between a land and a groove may not be possible.

Figures 7A, 7B, 7C:
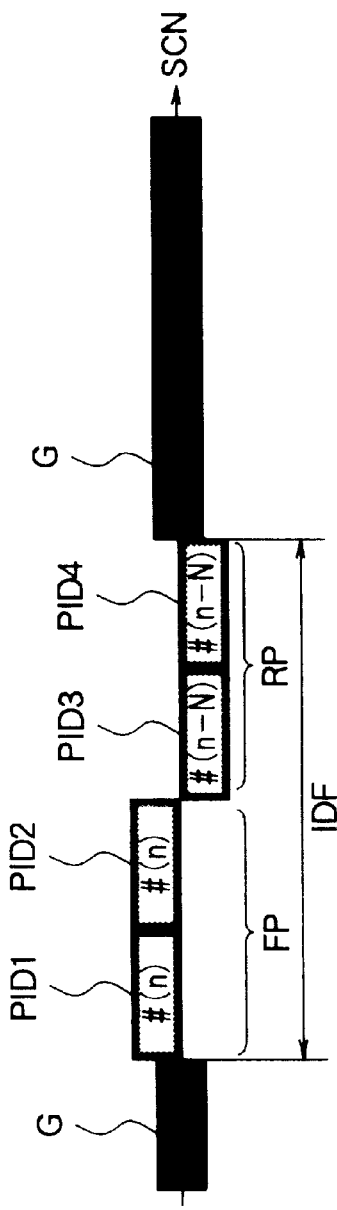
FIG. 7A shows scanning of identification data area in a groove track sector by a light spot.
FIG. 7B and FIG. 7C show the address values produced in the circuit of FIG. 6 during the scanning shown in FIG. 7A.

FIG. 7B and FIG. 7C show the address values supplied to the determination circuits 7 and 8, respectively when a beam spot, from an optical disk drive apparatus according to the third embodiment of the present invention is scanning a groove track sector, as indicated by SCN in FIG. 8A. FIG. 8B and FIG. 8C show the address values supplied to the determination circuits 7 and 8, respectively when a beam spot from the optical disk drive apparatus according to the third embodiment of the present invention is scanning a land track sector, as indicated by SCN in FIG. 8A. FIG. 7B and FIG. 7C show the values of the PID1 through PID4 when a groove track sector with an address value n is being accessed. FIG. 8B and FIG. 8C show the values of the PID1 through PID4 when a land track sector with an address value n+N is being accessed.

Referring to FIGS. 7B, 7C, 8B, and 8C, an abnormal state a indicates the case where a track in a zone that is inside of and next to the desired zone (target zone) is accessed. It is assumed that the difference in the number of sectors per zone between adjacent zones is "1". In this situation, the value of the N loaded from the controller 11 will be greater by "1" than the actual value of the track of the zone being accessed. Because it scarcely occurs that a track in a zone other than a next zone is accessed, the abnormal state a illustrates the case where a track in a next zone is accessed.

Similarly, an abnormal state b indicates the case where a track in a zone outside of and next to the desired zone (target zone) is accessed. In this situation, the value of the N loaded from the controller will be smaller by "1" than the actual value of the track of the zone being accessed. As described above, since it scarcely occurs that a track in a zone other than a next zone is accessed, the abnormal state b illustrates the case where a track in a next zone is accessed.

In the abnormal state a, the input values of the PID1 through PID4 supplied to the determination circuit 7 are n, n, n+1, and n+1, respectively. Thus, the input values supplied to the determination circuit 7 are not identical. The input values of the PID1 through PID4 supplied to the determination circuit 8 are n+N+1, n+N+1, n−N, and n−N, respectively. Thus, the input values supplied to the determination circuit 8 are not identical, either.

In such a case, the determination circuit 7 calculates the absolute value of the difference between the address values supplied thereto, i.e., $$|(n+1)-n|=1$$

and outputs this value to the selector 9. At the same time, the determination circuit 7 outputs the direct address value PID1 or PID2, i.e., the address value without N having been added. Similarly, the determination circuit 8 calculates the absolute value of the the difference between the address values supplied thereto, i.e., $$|(n+N+1)-(n-N)|=2N+1$$

and outputs this value to the selector 9. At the same time, the determination circuit 8 outputs the direct address value PID3 or PID4, i.e., the address value without N having been added. The selector 9 compares the absolute values, and selects the determination circuit 7 or 8 which has provided the smaller absolute value, and selects and the address value supplied from the selected one of the determination circuit 7 or 8. In the situation under consideration, the determination circuit 7 is selected, and the address value PID1 or PID2 is output from the selector 9.

When the abnormal state b has occurred, the same address value determination method is used, and the address value n can be obtained.

In the above description, it is assumed that a track next to a target track is accessed. However, if the same method of determination is applied, correct address n can be always obtained.

As described above, by using the optical disk drive apparatus according to this embodiment, the number N of sectors per track within the zone is supplied from the controller, and is loaded into the latches. Thus, four address values can be used to determine the address of the sector. An error in reading the address data thus can be reduced.

Further, even if access to a target zone by means of seek operation fails, and a track in a zone different from the target zone is accessed, and the number of the sectors per track is different from that of the target zone, land/groove discrimination and the identification of the sector address can yet be achieved.

In the first to third embodiments described above, four PID data are recorded in an identification data area IDF. If more than four PID data are recorded, the number of address data supplied to the determination circuits and the like will increase, and a sector address reading section can be configured adopting a similar concept.

Fourth Embodiment

Figure 9:
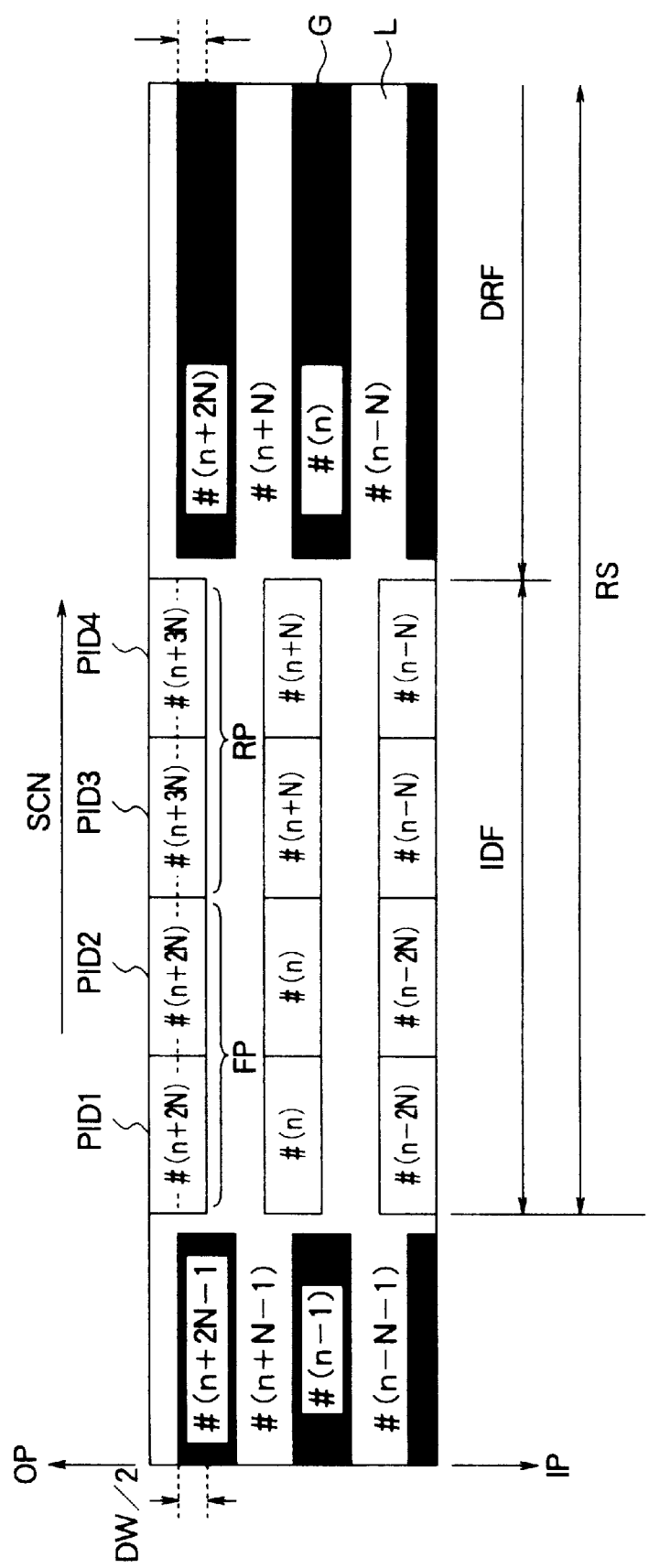
FIG. 9 schematically shows another example of arrangement of identification data areas and the address values within a track sector on an optical disk which can be used with an optical disk drive apparatus according to the invention.

The arrangement of identification data for an optical disk may also be different. FIG. 9 schematically shows the arrangement of identification data and the address values within a recording sector RS on an optical disk, which can also be used in connection with the above-mentioned embodiments. As shown in FIG. 9, the identification data areas IDF are shifted by substantially half a groove width Dw/2 radially outwards from the center of the groove G. The address of the groove track sector is recorded in the two parts PID1 and PID2 in the front half of the identification data area IDF, while the address of the land track sector is recorded in the two parts PID3 and PID4 in the rear half of the identification data area IDF.

Even with the above arrangement of identification data, the sector address can be identified using the optical disk drive apparatus and the method described in the first, second, or third embodiment. The discrimination between a land and a groove is also possible by using a tracking error signal in the same way as in the first embodiment. That is, the discrimination can be achieved based on the fact that when an identification data area IDF immediately before a groove track sector is scanned, the tracking error indicates an inward deviation, and when an identification data area IDF immediately before a land track sector is scanned, the tracking error indicates an outward deviation.

Fifth Embodiment

Figure 10:
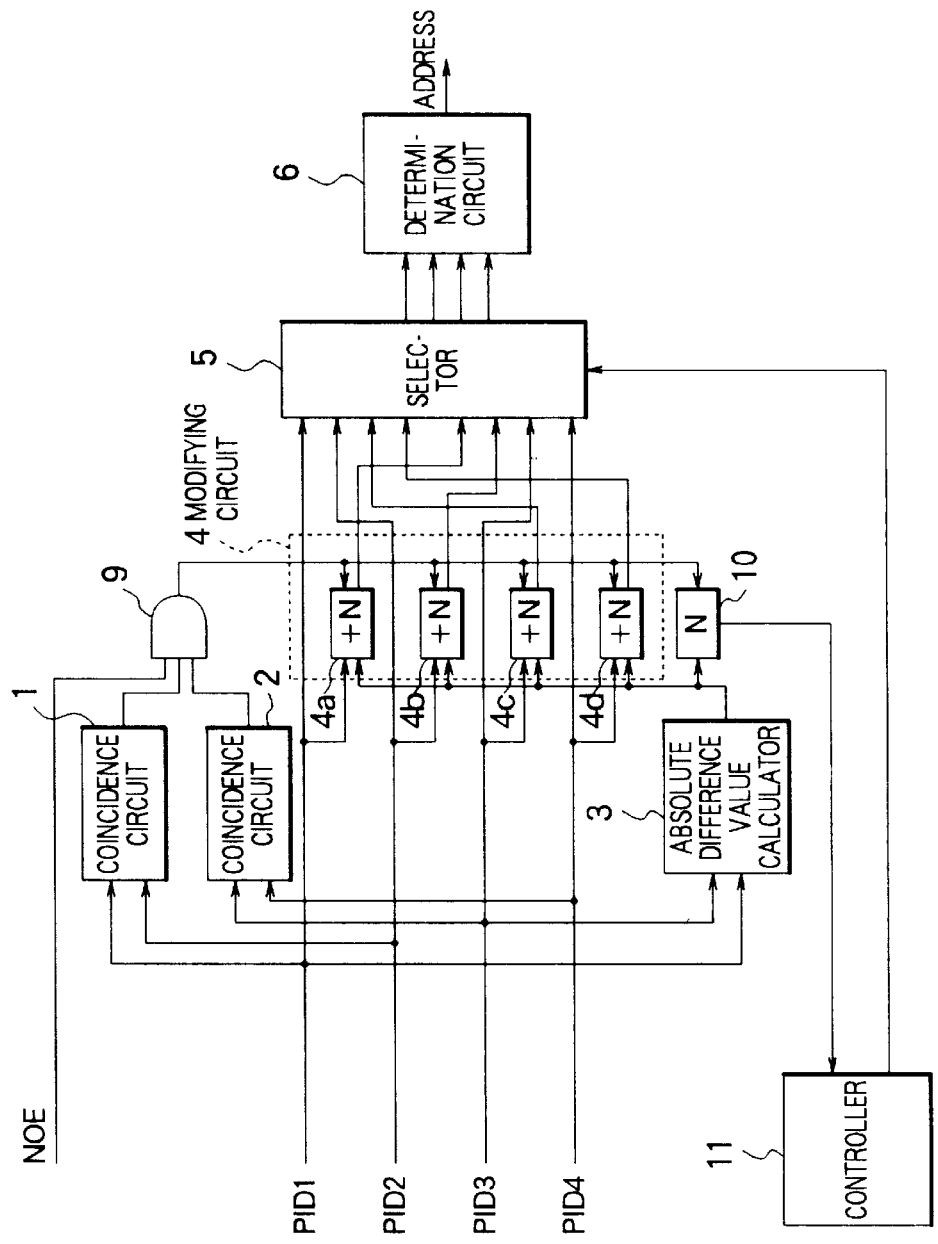
FIG. 10 is a block diagram showing the configuration of a sector address reading section in an optical disk drive apparatus according to a fifth embodiment of the present invention.
Figure 11:
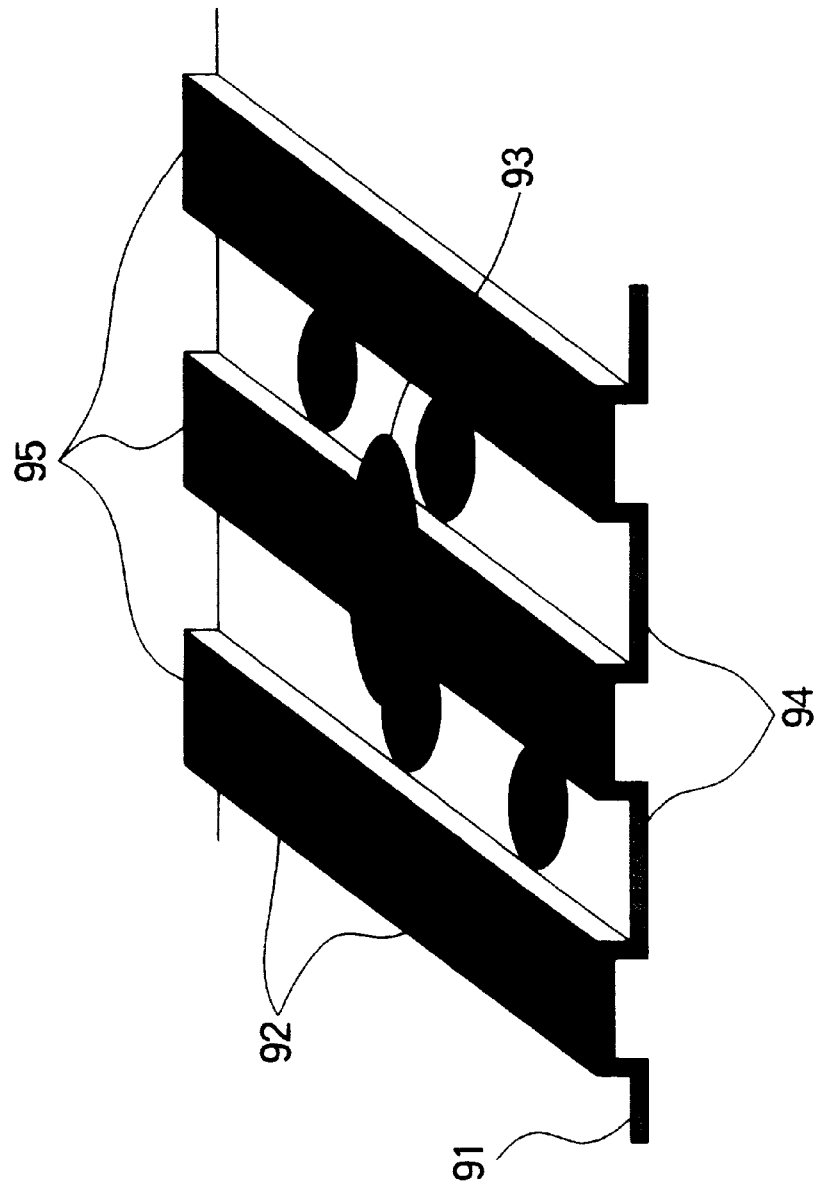
FIG. 11 shows a conventional land/groove recording optical disk.

The number N of sectors per track which is loaded into the latches 4a to 4d in the manner described in the first and the second embodiments may be checked by comparing the value which is supplied from the controller (typically formed of a CPU) 11 of the apparatus. FIG. 10 is a block diagram showing the configuration of a sector address reading section in an optical disk drive apparatus according to the fifth embodiment of the present invention. FIG. 10 is different from FIG. 1 in that a register 10 is provided for storing the output value N of the absolute difference value calculator 3, and that the output value N is supplied to the controller 11 for checking.

In the embodiments described, the inter-track address difference is equal to the number of sectors per track. The inter-track address difference may be different from the number of tracks per track within each zone. For instance, it may be a common value for all the zones. In such a case, the inter-track address difference is set equal to or greater than the number of the sectors per track in the outermost zone.

In the embodiments described, the address of a groove track sector is recorded in the front part of the identification data area, and the address of a land track sector is recorded in the rear part of the identification data area. However, this may be reversed.

In the embodiments described, the front part of the identification data area recording the address of the groove track is shifted radially outwards from the center of the groove, and the rear part of the identification data area recording the address of the land track is shifted radially inwards from the center of the groove adjacent to the land. However this does not impose a limitation to the invention. For instance, the part or the identification data area recording the address of the groove track may be shifted radially inwards from the center of the groove, and the part of the identification data area recording the address of the land track may be shifted radially outwards from the center of the groove adjacent to the land.

While particular embodiments of the invention have been shown and described, it will be obvious to those skilled in the art that changes and modifications may be made without departing from the invention in its broader aspects. The appended claims are therefore intended to cover all such changes and/or modifications as fall within the true spirit and scope of the invention. The matter set forth in the Foregoing description and accompanying drawings is offered by way of illustration only and not as a limitation on the scope of the invention. The actual scope of the invention is intended to be defined in the following claims.

What is claimed is:

1. A method for accessing an optical disk divided into a plurality of zones, each zone having a plurality of tracks, adjacent tracks being formed of alternating first type recording regions and second type recording regions to form a single spiral recording area having both first type and second type recording region tracks, each track having a number of sectors associated with its zone, and having a format in which sector addresses of a plurality of sectors are recorded in an identification data area shared by said plurality of sectors, said method comprising the steps of:

reading the sector addresses of said plurality of sectors from a same identification data area, including the sector address of a target sector;

modifying at least one of the sector addresses of said plurality of sectors read from the same identification data area, using an integer value inherent to the zone being accessed and representative of the number of sectors in a said track of that zone; and obtaining an address value of the target sector based on the at least one modified sector address obtained in said step of modifying.

2. The method according to claim 1, further comprising the step of determining said integer value inherent to the zone being accessed, from the addresses of the plurality of sectors contained in the same identification data area;

wherein said step of modifying the sector addresses comprises the step of:

storing said integer value thus determined; and using the stored integer value for the modification of the addresses in the identification data area.

3. The method according to claim 2, wherein said step of storing said integer value comprises latching or updating said integer value when the addresses read from an identification data area satisfy a predetermined condition;

whereby when the addresses read from a certain identification data area do not satisfy said predetermined condition, the integer value determined from the addresses read previously from another identification data area and is thereby latched or updated previously is used for the modification of the addresses. addresses.

4. The method of claim 1, wherein the first type recording regions are lands and the second type recording regions are grooves.

5. The method of claim 1, wherein said step of modifying is performed both when the target sector belongs to a track of the first type recording regions and when the target sector belongs to a track of the second type recording regions.

6. Apparatus for accessing an optical disk divided into a plurality of zones, each zone having a plurality of tracks, adjacent tracks being formed of alternating first type recording regions and second type recording regions to form a single spiral recording area having both first type and second type recording regions, each track having a number of sectors associated with its zone, and having a format in which sector addresses of a plurality of sectors are recorded in an identification data shared by said plurality of sectors, said apparatus comprising:

means for reading the sector addresses of said plurality of sectors from a same identification data area, including the sector address of a target sector;

means for modifying at least one of the sector addresses of said plurality of sectors read from the same identification data area, using an integer value inherent to the zone being accessed and representative of the number of sectors in a said track of that zone; and means of obtaining an address value of the target sector based on the at least one modified sector address obtained by said means for modifying.

7. The apparatus according to claim 6, further comprising means for determining said integer value inherent to the zone being accessed, from the addresses of the plurality of sectors contained in the same identification data area;

wherein said means for modifying the sector addresses stores said integer value thus determined.

8. The apparatus according to claim 7, wherein said means for modifying the sector addresses further uses the stored integer value for the modification of the addresses in the identification data area.

9. The apparatus according to claim 8, wherein said means for modifying the sector addresses latches or updates said integer value when the addresses read from an indentification data area satisfy a predetermined condition;

whereby when the addresses read from a certain identification data area do not satisfy said predetermined condition, the integer value determined from the addresses read previously from another identification data area and is thereby latched or updated previously is used for the modification of the addresses.

10. The apparatus of claim 6, wherein the first type recording regions are lands and the second type recording regions are grooves.

11. The apparatus of claim 6, wherein said means for modifying modifies at least one of the sector addresses both when the target sector belongs to a track of the first type recording regions and when the target sector belongs to a track of the second type recording regions.

\* \* \* \* \*